United States Patent [19]

Lowicki et al.

[11] 3,761,570

[45] Sept. 25, 1973

[54] PROCESS FOR REMOVING SULFUR COMPOUNDS FROM GAS

[75] Inventors: Norbert Lowicki, Duisburg-Hamborn; Gernot Hanig, Dinslaken-Hisfeld, both of Germany

[73] Assignee: Grillo-Werke Aktiengesellschaft, Duisburg-Hamborn, Germany

[22] Filed: Dec. 17, 1969

[21] Appl. No.: 886,017

[30] Foreign Application Priority Data
Dec. 13, 1969   Germany.................. P 19 62 586.5

[52] U.S. Cl................................ 423/225, 423/242
[51] Int. Cl............................................ B01d 53/34
[58] Field of Search.................... 23/2, 250, 178, 3; 423/210, 220, 225, 242

[56] References Cited
UNITED STATES PATENTS

| | | | |
|---|---|---|---|
| 1,741,113 | 12/1929 | Jacobson................................. | 23/3 |
| 2,019,468 | 10/1935 | Bacon...................................... | 23/3 |
| 1,819,658 | 8/1931 | Sperr....................................... | 23/3 |
| 3,298,781 | 1/1967 | Fukuma et al........................... | 23/2 |
| 3,492,083 | 1/1970 | Lowicki et al.......................... | 23/25 |

*Primary Examiner*—Earl C. Thomas
*Attorney*—Burgess, Dinklage and Sprung

[57] ABSTRACT

Sulfur compounds are removed from gases by contacting the gas with an aqueous suspension of a hydrolyzed admixture of an amphoteric component, more particularly oxide, hydrated oxide or hydroxide of aluminum, zinc, iron or manganese, and a basic component, more particularly an oxide or hydroxide of an alkali metal or alkaline earth metal.

24 Claims, No Drawings

PROCESS FOR REMOVING SULFUR COMPOUNDS FROM GAS

This invention relates to a process for removing sulfur compounds from gas containing at least one sulfur compound comprising contacting the gas with a hydrolyzed admixture of absorbent comprising (1) an amphoteric component and (2) a basic component, wherein amphoteric component (1) is at least one member of the group consisting of oxides, hydrated oxides and hydroxides of aluminum, zinc, iron, and manganese, and basic component (2) is at least one member of the group consisting of oxides and hydroxides of alkali metals and alkaline earth metals.

U.S. Pat. application Ser. No. 525,996 filed February 8, 1966, now patent 3,492,083, discloses a process for the desulfurization of industrial waste gases, especially flue gases, which process comprises contacting the gas with an absorbent comprising (1) an oxide, hydrated oxide or hydroxide of aluminum, zinc, iron or manganese or a mixture of any two or more of such compounds, and (2) an oxide or hydroxide of an alkali metal or an alkaline earth metal or a mixture of any two or more of such compounds.

In a paper "Das neue Abgas-Entschwefelungsverfahren der Grillo-Werke AG" published in "Zeitschrift für Erzbergbau und Metallhüttenwesen," Vol. XXI (1968), No. 12, pp. 567–571, one of the inventors gives technical details of the new method.

The disclosure of the above-mentioned U.S. Pat. application Ser. No. 525,996 and of the above-mentioned paper is included herein by reference.

British Pat. No. 1,144,071 which corresponds to the above-mentioned U.S. patent application discloses a process for the removal of sulfur and sulfur compounds from industrial waste gases, especially flue gases, wherein the gas containing sulfur compounds is contacted with a solid absorbent which consists of a mixture of amphoteric components and basic components. Oxides, oxide hydrates, and/or hydroxides of manganese and/or iron are especially mentioned as amphoteric components. The basic component comprises oxides or hydroxides of alkaline earth metals and/or alkali metals, particular importance being attributable to magnesium. One absorbent described as particularly important in said British Patent is a mixture of the corresponding oxidic compounds of manganese and magnesium. If desired, this composition may additionally contain corresponding compounds of iron.

In the process of British Pat. No. 1,144,071, the waste gas to be desulfurized is contacted with the absorbent in such a manner that absorbent compositions which are loaded with sulfur and sulfur compounds are obtained. This loaded mass is then freed from sulfur in a separate process step by roasting. This desulfurization may be performed in a plurality of steps by first reducing the sulfur-loaded mass with carbon, especially coke, at temperatures above 1,000°C. and then subjecting it in a second step to an oxidative treatment at a temperature within the range from 300 to 800°C. However, in case of the commercially particularly important mixtures of the oxidic compounds of magnesium and manganese and, if desired, iron, it is also possible to subject the absorbent which is loaded with sulfur and/or sulfur compounds directly to oxidizing roasting in mixture with carbon without prior reducing treatment. In this case temperatures of at least 750°C. and preferably between 800°C. and 1,000°C. are used.

This regeneration by roasting involves the formation of oxide compounds between the basic and the amphoteric metal components in the absorbent thereby mutually protecting both of the components against deactivation in the temperature range necessary for the roasting step. If compounds of magnesium and manganese are used, well defined magnesium manganites may form.

To permit the re-use of the oxidic absorbent thus roasted as a highly active absorbent in the process of British Pat. No. 1,144,071, it is necessary to hydrate the roasted composition. For this purpose, the roasted mass is slurried in water at a temperature ranging between 60 and 100°C. and treated for 2 to 8 hours.

The oxidic material obtainable by roasting is preferably composed of well defined magesium manganites.

Detailed study of the dependence of absorption activity on the degree of hydration of the absorbent has shown that, at least for the absorption of $SO_2$ and $H_2S$, it is of decisive importance to approach as close as possible the theoretically possible hydration. Both the rate of sulfur absorption in the absorbent (and hence the residence time of the waste gas being purified in contact with the absorbent) and the time required for substantially complete absorption of the particular sulfur-containing contaminant by the absorbent are unquestionably functions of the degree of hydration. This is evident from the following comparative studies:

An absorbent comprising 3 moles of MgO and 1 mole of $MnO_2$ and, therefore, corresponding to the hypothetical formula $Mg_3MnO_5$ is theoretically capable of absorbing 25.8% by weight of water. This would be the maximum possible hydration on the assumption that all of the MgO is converted into $Mg(OH)_2$ and all of the $MnO_2$ is converted into $MnO(OH)_2$.

When designating the degree of hydration by the symbol $\alpha$, it is equal to 1 if the maximum possible water absorption for the analytically determined molar ratio of the manganite present has taken place.

The study of the dependence of the degree of hydration $\alpha$ on hydration time and the temperature used is summarized hereafter in Table I.

TABLE I

| Temp., °C. | Time in minutes | | | | | | | |
|---|---|---|---|---|---|---|---|---|
| | 10 | 30 | 45 | 60 | 90 | 120 | 180 | 240 |
| 20 | α=0.1 | α=0.1 | α=0.1 | α=0.1 | α=0.14 | α=0.17 | α=0.26 | α=0.30 |
| 50 | 0.22 | 0.32 | 0.48 | 0.52 | 0.58 | 0.60 | 0.64 | 0.62 |
| 70 | 0.36 | 0.56 | 0.64 | 0.73 | 0.81 | 0.85 | 0.82 | 0.82 |
| 90 | 0.35 | 0.58 | 0.70 | 0.70 | 0.82 | 0.80 | 0.81 | 0.82 |

In comparative studies, no dependence of the degree of hydration and of the rate of hydration on the molar ratio $MgO/MnO_2$ within the range of 2:1 to 6:1 and on the degree of intermixing of the solid mass and water was found provided that constant thorough intermixing of the suspension is assured. The production even of strong shearing forces by means of turbine or tooth cage mixers had no influence.

The relationship between the degree of hydration and the activity of the absorbent is apparent from the following studies:

50 Grams of the hydrated absorbent (based on dry substance in each case) are slurried in 100 ml of water. An air stream containing 1% $SO_2$ was bubbled through the slurry while constantly stirring. The feed rate is one liter per minute and the temperature of the suspension is 70°C. The activity of the mass is defined as the time in minutes elapsing before first traces of $SO_2$ break through.

How clearly the absorption activity depends on the degree of hydration is evident from Table II:

Table II

| $\alpha$ | Period of 100% absorption in minutes |
|---|---|
| 0.1 | 2 |
| 0.26 | 4 |
| 0.36 | 7 |
| 0.48 | 17 |
| 0.52 | 23 |
| 0.58 | 28 |
| 0.58 | 28 |
| 0.64 | 32 |
| 0.70 | 33 |
| 0.81 | 34 |

Furthermore, absorption experiments with dry or only slightly moistened and not previously hydrated absorbents showed no measurable $SO_2$ absorption in the temperature range between 20 and 90°C. This was the case even when the air current containing $SO_2$ had previously been saturated with steam.

In further experiments, appropriate absorbents were used to determine the residence times which are necessary to absorb about 90% of the $SO_2$ content from a $SO_2$/air mixture containing 0.2% $SO_2$. The absorbent was sprayed into the gas stream in the form of a suspension. The following results were obtained under otherwise entirely identical conditions with respect to the gas, the temperature, rate and temperature of the circulating suspension and the atomization pressure:

TABLE III

| $\alpha$ | Required residence time in seconds |
|---|---|
| <0.1 | 19 |
| 0.45 | 2 |
| 0.64-0.70 | ~0.05 |

This dependence on the degree of hydration of the absorbent determined for the absorption of $SO_2$ is correspondingly applicable to the absorption of hydrogen sulfide from waste gases.

If a freshly roasted magnesium manganite is suspended in water and the suspension is contacted with a gas containing hydrogen sulfide, no absorption at all takes place irrespective of whether the gas is introduced into the suspension or the latter is sprayed into the gas.

Studies have shown that absorption of $H_2S$ does not start to an extent of practical interest before the degree of hydration $\alpha$ is above 0.6. With $\alpha$ values above 0.7, $H_2S$ is then absorbed rapidly, and with $\alpha$ values of about 0.8, absorption is substantially complete.

TABLE IV

| Degree of hydration $\alpha$ | Absorption in percent of the initial content |
|---|---|
| 0.45 | <10% |
| 0.64 | ~50% |
| 0.72 | 86-90% |
| 0.80 | 98-100% |

In these comparative tests, the following experimental conditions were maintained: Rate of gas flow, 300 std. cu.m. per hours; $H_2S$ content, 2 g. per std. cu.m.; gas temperature, 45-48°C.; residence time, ~ 1 second.

Based on this knowledge of the dependence of absorption activity of absorbent used on the degree of hydration, a process has now been developed which relates to an improvement of the general process principle described in British Pat. 1,144,071. The new process is especially directed to the greatest possible saving of expense in the desulfurization of waste gas. Thus it gives consideration to the desires of the industry involved, for which such desulfurization of waste gas is a mandatory but nevertheless only burdensome process step which does not contribute to productivity of the plant.

Accordingly, it is an object of the invention to provide a continuous process for the absorption of sulfur compounds from waste gases into basic absorbent compositions based on hydroxides and/or oxide hydrates of magnesium and manganese and, if desired, of iron with regeneration of the sulfur-loaded absorbent by reducing roasting followed by hydration and with return of the hydrated metal oxide compounds thus formed into the absorption stage. The new process comprises bringing the absorbent as an aqueous suspension in finely divided form into turbulent contact with the waste gas stream in the absorption stage; recycling the aqueous suspension into the absorption stage after separation from the treated waste gas stream while using temperatures up to about 110°C. in the absorption stage; separating absorbent from the aqueous suspension and passing it to the regeneration stage while adding a corresponding amount of regenerated absorbent to the aqueous suspension.

Preferably the fresh absorbent is added to the circulating aqueous suspension of the largely loaded absorbent at a rate sufficient that the pH value of the aqueous suspension of the absorbent ranges from about 6 to 7 and preferably from about 6.5 to 7. According to a further feature of the invention, and this is one of the most important elements of the new process, previous hydration of the regenerated mass is dispensed with when returning the adsorbent regenerated by roasting into the aqueous suspension of the absorption stage. Instead, the magnesium manganite compounds obtained by roasting and the corresponding iron compounds which may be present are added as they are to the aqueous suspension and are thus hydrated in situ in the absorption stage. In this manner, separate hydration of the absorbent, which has hitherto been considered necessary, becomes superfluous. The overall process is thus greatly simplified for the user. Consideration must be given to the fact that, as a rule, regeneration of the sulfur-loaded absorbent is not performed by the user of the waste gas purifying process but by a more or less remote sulfuric acid plant. The user of the desulfurization process now needs only deliver the fouled absorbent separated from the absorption stage to the plant performing the regeneration. In return he receives regenerated, freshly roasted product which can be added as such to the suspension in the absorption stage.

That such a simplification of the process is possible is due to the fortunate combination of a number of phenomena. On the one hand, the activity of the absorbent has been found to be substantially independent of the degree to which it is loaded. As long as the absorbent is capable of absorbing sulfur compounds under the conditions of the process, it will do so with the degree of activity derived mainly from its degree of hydration. This means, however, that it is not necessary to operate with fresh suspensions of the absorbent or with suspensions which are only slightly loaded with sulfur and sulfur compounds to accomplish satisfactory absorption results, but that it becomes possible to operate with an absorbent which is almost completely loaded with sulfur and sulfur compounds. The remaining capacity in the absorbent suffices to obtain excellent desulfurization results as long there is the assurance that the limit of absorptive capacity is not actually reached. The simplest method of detecting such a state of load or contamination is to monitor the pH value of the aqueous suspension. When freshly regenerated absorbent is stirred into water and hydrated, a pH value ranging from 8.5 to 9 establishes in the aqueous suspension that is formed. The absorbent, when completely loaded with sulfur and sulfur compounds, shows in aqueous suspension a pH which, as a rule, ranges around 6, especially just below 6. By controlling the pH of the suspension so as to keep it especially within the range of 6.5 to 7 by addition of freshly regenerated absorbent, the attainment of a very high level of charge is assured without reaching the limiting state of complete loading. This assures at the same time that the time for which absorbent is kept out of use between the absorption and regeneration cycles is kept to a minimum.

The fact that the return of the roasted absorbent into the aqueous suspension of the absorption stage becomes possible without previous intensive hydration and that highly active suspensions are obtained despite the previously described dependence of activity of the mass on the degree of hydration is due to the surprising discovery that the rate of hydration of the metal oxides involved is influenced in a decisive manner by the pH of the aqueous medium. While two to eight hours depending on temperature were previously necessary for the hydration with the use of pure water, it has now surprisingly been found that this hydration time is reduced to a few minutes when the dry, freshly regenerated absorbent is added directly to the circulating suspension which is precisely in the most favorable pH range between 6.5 and 7.

The performance of the absorption in the manner described herein, however, requires a reduction of the gas temperatures and humidification of the gases to a higher degree than is called for in British Pat. No. 1,144,071. Accordingly, wet desulfurization in a gas temperature range between 40 and 110°C. and preferably between 70 and 100°C is preferred. It is readily possible to desulfurize even cold gases, e.g., in a temperature range between 10 and 40°C.

The very high activity of the highly hydrated masses now makes it possible to operate with very brief periods of contact between the absorbent suspension and the waste gas stream. As a rule, residence times of less than about 3 seconds are used, periods of less than 1 second being substantially always sufficient for adequate desulfurization of the waste gas stream, provided that sufficiently good intermixing of gas and liquid is assured.

For this purpose, the suspension of the absorbent may be sprayed into the waste gas stream, using conventional nozzles and pumps.

It has furthermore been found, however, that even nozzles and high-pressure pumps can be dispensed with if the suspension of the absorbent and the waste gas stream are contacted under conditons such that the energy of the flow of the waste gas stream assures sufficiently fine division and distribution of the suspension. In this manner there is no need for the expenditure of additional energy on the fine division of the suspension. Technically this is accomplished by passing the waste gas current through a reaction chamber having the form of a tube. If the flue gas stream in such a tube has a velocity of at least 5 m./sec and preferably between 8 and 15 m./second, sufficient division and distribution of the aqueous suspension will occur even when the latter is made to enter the gas stream through normal feed lines at the beginning of the reaction tube. This reaction tube may especially be a vertical tube to which the aqueous absorbent suspension is fed at the base after the flue gas has been cooled and humidified by means of cold water, if desired. The waste gas stream moving rapidly through the tube entrains the absorbent suspension in finely divided or atomized form. After having left the reaction tube, the liquid phase is separated from the gaseous phase and returned to the base of the reaction tube. However, operation in the reaction tube may equally well be with cocurrent flow in downward direction. In this case, the suspension is to be fed at the top of the reaction tube. Moreover, it is not absolutely necessary to use a vertical reaction tube.

The surprisingly high activity of the absorbent composition and the resultant particularly great advantages for application in practice are obtained especially with magnesium manganites in which MgO and $MnO_2$ are present in molar ratios of 1 to 10 MgO combined with 1 to 4 $MnO_2$. Particularly preferred are molar ratios of $MgO/MnO_2$ ranging from 3:1 to 6:1. If iron is also present in the absorbent composition, its amount preferably is not more than 50%, especially not more than 25% of the manganese proportion of an iron-free absorption composition consisting of manganese and magnesium compounds.

Another element of the invention which is important for the economy of the process relates to the separation of the loaded absorbent composition from the recycle stream of the absorbent suspension in the absorption stage.

This portion of the suspension which is tapped from the recycle line may be passed to a conventional drying operation, e.g., to a spray dryer or fluid bed dryer, where it is dried with a partial stream of the hot flue gas. The result is a sand-like, granular loaded absorbent mass which is passed to the regeneration plant. This partial stream of hot flue gas used for drying is preferably introduced thereafter into the desulfurization stage.

The recovery of a transportable, dry, loaded absorbent may, if desired, be substantially simplified by filtering the suspension prior to treatment with the hot flue gas and then subjecting to further drying only the filter cake constituted by the loaded suspension mass. For it has surprisingly been found that the contents of dissolved sulfur in the aqueous phase of the recirculated suspension at pH 6.5 to 7 are extremely low. At a temperature between about 30 and 50°C, the content of dissolved sulfur in the liquid phase of the suspension is only about 30 g./liter. This low sulfur content is apparently attributable to the formation of sparingly soluble sulfur-containing crystals under the process conditions, the nature of which has not yet been determined in detail. In any case, it is possible with utilizaiton of this phenomenon to filter the absorbent suspension withdrawn from the absorber, after slight cooling if desired, and thus obtain a filter cake containing only limited amounts of water, e.g. 40 to 50% of water. This reduces not only considerably the amount of water to be removed by drying but also permits especially the use of the substantially cheaper belt dryers or plate dryers in place of the expensive spray dryers or fluid bed dryers. In addition, this procedure offers the advantageous possibility of drying the loaded composition directly in granulated form (pellets) for subsequent regeneration in a fluidized bed. This facilitates transportation and further processing. Furthermore, prior to drying or prior to shaping into pellets, as the case may be, the filter cake can be mixed with coal dust which is preferably added in the amount necessary for reduction of sulfate sulfur to $SO_2$. It is also possible to impregnate the pelletized, dried and loaded mass with waste oil prior to regeneration, thus bringing the reducing agent required for the regeneration of the absorbent into contact with the sulfur compounds.

For the regeneration, the information given in British Pat. No. 1,144,071 is fundamentally applicable. Development in practice has shown, however, that not only coal or coke can be used as reducing agent, but that other technical reducing agents are also suitable. For example, roasting of the loaded absorbent is possible in the presence of coal, coke, petroleum, natural gas or other reducing gases. Use of elemental sulfur as reducing agent or at least as part thereof is also possible. The treatment may be performed in conventional roasting furnaces of any type. Preferably, story roasting furnaces or fluidized-bed roasting furnaces equipped for waste heat economy are used. It may furthermore be preferred to use mixtures of carbonaceous reducing agents and sulfur. In this manner, normally concentrated roasting gases are obtained, which permit the roasting furnace capacity to be utilized to a conventional extent.

The following examples illustrate the invention.

EXAMPLE 1

A gas stream of 25,000 std.cu.m. per hour, at a temperature of 220°C, is introduced into a reactor in the form of a tube 6 meters long and 800 mm. in diameter. At the base of the vertical tube, the temperature of the entering gas is reduced to about 95°C. by spraying water into it. Just above are three tubes of 12 mm. inside diameter each, which are arranged one above the other at a distance of about 300 to 400 mm. Through these tubes, an absorbent suspension of pH 6.5 is pumped into the reactor tube in cocurrent flow relation with the gas passing through. The suspension is fed at a rate of 9,500 liters/hr. and the concentration of absorbent therein is 30%.

The $SO_2$ content of the flue gas passed through the reactor tube is measured at the inlet end and at the outlet end. It is 2.4 grams/std.cu.m. of $SO_2$ at the inlet and 0.165 grams/std.cu.m. at the top, i.e., the outlet of the absorption section. Thus, the degree of absorption is 93%. The gas velocity in the tube is 15 m./sec.

By far the greatest part of the absorbent suspension entrained by the gas stream is separated by a centrifugal separator arranged downstream of the absorption section while the slight residual amount is removed by filtration through a layer of coarse coke.

The suspension flows back into a vessel provided with an agitator and is returned into the reactor by the pump. A certain amount of suspension is continuously tapped from the return line and, in place thereof, fresh regenerated absorption composition is metered directly into the stirred vessel by means of a vibratory proportioning trough, metering being controlled by the pH value.

The loaded absorbent suspension tapped from the return line is fed through a second, smaller agitated tank to a spray dryer where it is dried with a partial stream of the hot flue gas.

The dry, loaded absorbent has a sandy-granular condition and is delivered to the regeneration unit.

EXAMPLE 2

Flue gas containing 2.6 grams/std.cu.m. of $SO_2$ is desulfurized at a rate of 25,300 std.cu.m./hr. by the method described in Example 1.

The absorbent suspension having a solids concentration of about 30% is maintained at pH 6.5 to 6.8 by addition of fresh, dry and roasted absorbent.

In the present case, 9,400 liters/hr. of suspension are recirculated. During the absorption process, this recirculating absorbent suspension is warmed to a temperature of 70 to 75°C. A partial amount of about 530–550 liters/hr. of the absorbent suspension running off from the absorption tube and the drop separator arranged downstream thereof is tapped and passed to a cooler. This tapped amount of suspension is cooled to a temperature of 20–25°C. thereby crystallizing the dissolved sulfates, sulfites and, as the case may be, bisulfites. A residual content of these compounds which reaches a substantially constant level and corresponds to 28-30 g./liter of S remains in the aqueous phase.

To obtain a uniform crystalline mass the particle size of which is not too small, a quantity of liquid which is substantially greater than that of the suspension being tapped continuously is initially charged and the warm suspension is introduced into this liquid. In this manner, a large amount of nuclei of crystallization is offered to the inflowing loaded absorbent suspension and a well filterable crystalline mass is formed by uniformly stirring this stock suspension at a speed which is not excessively high. Cooled suspension at a rate which is the same as that of inflowing fresh suspension is continuously withdrawn from the stirred vessel and filtered. Continuously operating rotary filters the maintenance of which may be minimized may be used for this purpose.

The filter cake contains about 30 to 35% of moisture and is passed to a belt dryer, plate dryer or a similar commercially available apparatus.

The dried filter cake contains about 15 to 19% S and, therefore, has approximately the same charge as the spray dried mass. The filtrate having a residual content of about 28 to 30 g./liter of sulfur which is present substantially in the form of magnesium sulfate is returned to the circulating absorbent suspension. At the same time, water is added at a rate which corresponds to the amount of water removed in the form of residual moisture adhering to the filter cake and to the additional loss by evaporation during the absorption process.

This mode of operation reduces the heat input necessary for drying the absorbent suspension to roughly one half of the amount necessary for spray drying and, moreover, entails economy in plant investment cost due to the possibility of using simpler and, consequently, more inexpensive drying apparatus.

EXAMPLE 3

The filter cake consisting of the charged absorbent and obtained in the process described in Example 2 is mixed with fine coal sludge in an amount of 0.5 to 1 part of coal per part of absorbent (calculated as dry substance). The moist plastic mixture is then scraped by feed rolls into the links of the chain belt of a belt dryer and dried. Due to shrinkage, the resultant hard and dry granules having a size of, for example, 6 to 8 mm. can be readily poured from the belt. The free flowing, non-dusting charged absorbent is very well transportable. In addition, it has the advantage that these pellets lend themselves particularly well to regeneration in fluidized-bed roasting furnaces.

Of course, ground (or precipitated) elemental sulfur may be admixed to the mass prior to drying in addition to coal to further improve the subsequent roasting.

The $MnO_2/MgO$ molar ratio of the absorbent used in these examples was 1:3.5 to 1:4.2.

What is claimed is:

1. Process for removing a sulfur compound from gas containing at least one sulfur compound comprising contacting the gas with an absorbent in aqueous suspension, said absorbent comprising hydrated, roasted admixture of an amphoteric component of the group manganese oxide, hydrated manganese oxide and manganese hydroxide, and a basic component of the group magnesium oxide and magnesium hydroxide, the degree of hydration, $\alpha$, of the absorbent being at least 0.6, in a contacting zone for charging of the absorbent with sulfur, withdrawing the absorbent from the contacting zone as an aqueous suspension, and recycling withdrawn aqueous suspension to the contacting zone.

2. Process according to claim 1, wherein the temperature of the gas during said contacting is up to about 110°C.

3. Process according to claim 1, wherein the temperature of the gas during said contacting is about 40 – 110°C.

4. Process according to claim 1, wherein the pH of the aqueous suspension is about 6 to 7.

5. Process according to claim 1, wherein the pH of the aqueous suspension is about 6.5 to 7.

6. Process according to claim 1, the suspension having a solids content of about 15 - 50 wt.-%.

7. Process according to claim 1, the suspension having a solids content of about 25 - 40 wt.-%

8. Process according to claim 1, the contacting time being less than about 3 seconds.

9. Process according to claim 1, wherein the gas is contacted with the aqueous suspension at a gas velocity of at least 5 meters/sec.

10. Process according to claim 1, wherein sulfur dioxide is removed from the gas.

11. Process according to claim 1, wherein hydrogen sulfide is removed from the gas.

12. Process according to claim 1, said admixture comprising magnesium manganites.

13. Process according to claim 12, the magnesium manganites containing MgO and $MnO_2$ in a molar ratio of 1 to 10 MgO to 1 to 4 $MnO_2$.

14. Process according to claim 13, said molar proportion of MgO to $MnO_2$ ranging from 3:1 to 6:1.

15. Process according to claim 1, wherein the temperature of said contacting is about 70–100°C.

16. Process according to claim 1, the contacting time being less than about 3 seconds, and the gas velocity during said contacting is at least 5 meters/sec.

17. Process according to claim 1, the contacting time being less than 1 second.

18. Process according to claim 1, and removing a portion of charged absorbent, and adding roasted absorbent to the recycled aqueous suspension for hydration thereof in the aqueous suspension.

19. Process according to claim 18, and roasting the removed, charged absorbent and utilizing the roasted absorbent thereby produced as the roasted absorbent added to the recycle stream.

20. Process according to claim 18, wherein the pH of the aqueous suspension is about 6 to 7.

21. Process according to claim 18, wherein aqueous medium of the aqueous suspension is removed with the removed charged absorbent, the removed aqueous medium is filtered from the removed charged absorbent, and the filter cake is dried, and the filtrate is returned to the aqueous suspension.

22. Process according to claim 20, wherein said sulfur compound is at least one of the group sulfur dioxide and hydrogen sulfide, the temperature of said contacting is up to 110°C, and said oxidic compounds comprise magnesium manganites containing MgO and $MnO_2$ in a molar ratio of 1 to 10 MgO to 1 to 4 $MnO_2$.

23. Process according to claim 22, wherein the gas contacted with the absorbent is wet.

24. Process according to claim 22, and roasting the removed charged absorbent to produce the roasted absorbent added to the recycled aqueous suspension.

* * * * *